(12) United States Patent
Glance

(10) Patent No.: US 6,732,088 B1
(45) Date of Patent: May 4, 2004

(54) COLLABORATIVE SEARCHING BY QUERY INDUCTION

(75) Inventor: Natalie S. Glance, Meylan (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/464,454

(22) Filed: Dec. 14, 1999

(51) Int. Cl.⁷ .............................................. G06F 17/30
(52) U.S. Cl. .................... 707/3; 707/2; 707/5
(58) Field of Search ................... 707/2, 3, 5

(56) References Cited

U.S. PATENT DOCUMENTS

| | | | | |
|---|---|---|---|---|
| 5,659,725 A | * | 8/1997 | Levy et al. ..................... | 707/3 |
| 5,659,732 A | * | 8/1997 | Kirsch ............................ | 707/5 |
| 5,758,335 A | * | 5/1998 | Gray ............................... | 707/2 |
| 5,911,138 A | * | 6/1999 | Li et al. ......................... | 707/3 |

OTHER PUBLICATIONS

[Adamic99] Lada Adamic, "The Small World Web." Xerox PARC Technical Report, 1999. Available at: http://www-parc.parc.xerox.com/istl/groups/iea/www/SmallWorld.html, as published on the internet.
[Alexa] http://www.alexa.com, as published on the internet, printed Mar. 8, 2000.
[Alta Vista] http://www.altavista.com/, as published on the internet, printed Mar. 8, 2000.
[AskJeeves] http://www.ask.com/, as published on the internet, printed Mar. 8, 2000.
[Brauen71] "Document Vector Modification in The Smart Retrieval System: Experiments in Automatic Document Processing, " Ed. Gerald Salton, Englewood Cliffs, NJ, 1971.
[DirectHit] http://www.directhit.com/, as published on the internet, printed Mar. 8, 2000.
[eZmark] http://www.ezmark.com/, published on the internet, Mar. 8, 2000.
[FD97] Fitzpatrick, Larry and Dent, Mei, "Automatic Feedback Using Past Queries: Social Searching?" in *Proceedings of SIGIR '97*, Philadelphia, PA., 1997.
[Google] http://www.google.com/, as published on the internet, printed Mar. 8, 2000.

(List continued on next page.)

*Primary Examiner*—Charles Rones

(57) ABSTRACT

A method and system to facilitate searching a data collection, such as the World Wide Web, that takes advantage of the collective ability of all users to create queries to the data collection. First, a node-link graph of all queries submitted to a data collection within a given period of time is constructed. In the case of the World Wide Web, the queries would be to a particular search engine. In the graph, each node is a query. There is a link made between two nodes whenever the two queries are judged to be related. A first key idea is that the determination of relatedness depends on the documents returned by the queries, not on the actual terms in the queries themselves. For example, a criterion for relatedness could be that of the top ten documents returned for each query, the two lists have at least one document in common. The invention also describes a way to allow the user to peruse the network of related queries in an ordered way: following a path from a first cousin, to a second cousin to a third cousin, etc. to a set of results. By doing this, the user is exposed to related documents that were not returned as a result of their query. A second key idea is that the construction of the query graph transforms single user usage of the data collection (e.g. search) into collaborative usage: all users can tap into the knowledge base of queries submitted by others. This is because each of the related queries represents the knowledge of the user who submitted the query.

15 Claims, 10 Drawing Sheets

OTHER PUBLICATIONS

[KP99] Glance, N., Arregui, D., and Dardenne, M., "Making Recommender Systems Work for Organizations," in *Proceedings of PAAM'99*, London, England, Apr. 1999. Research prototype at: http://muselle.grenoble.xrce.xerox.com:2000/, as published on the internet.

[Kleinberg97] Kleinberg, Jon M., "Authoritative Sources in a Hyperlinked Enviornment," in *Proceedings of the 9th ACM–SIAM Symposium on Discrete Algorithms*, Ed. H. Karloff, 1998.

[metaspy] http://www.metaspy.com/spymagic/Spy, as published on the internet, printed Mar. 8, 2000.

[Rag95] Raghavan, V. V., Sever, H., "On The REuse of Past Optimal Queries," *Proc. Of SIGIR95*, Seattle, WA, 1995.

* cited by examiner

COLLABORATIVE SEARCHING BY QUERY INDUCTION

FIELD OF THE INVENTION

The present invention is related to the field of information retrieval, and in particular to the field of searching for information on network based information systems such as the World Wide Web.

BACKGROUND OF THE INVENTION

Searching for information in the ever-increasing universe of electronic information, for example as found on the World Wide Web (hereinafter referred to as the Web), can be both satisfying and frustrating. Making sense of very large collections of linked documents and foraging for information in such environments is difficult without specialized aids. Two sorts of aids have evolved to assist seekers of information. The first are structures or tools that abstract and cluster information in some form of classification system. Examples of such would be library card catalogs and the Yahoo! Web site. The second are systems that attempt to predict the information relevant to a user's needs and to order the presentation of information accordingly. Examples would include search engines such as Lycos, which take a user's specifications of an information need, in the form of words and phrases, and return ranked lists of documents that are predicted to be relevant to the user's need.

Another class of tools is recommender systems. Recommender systems provide a list of recommended subsequent web pages worth viewing based on some predetermined filtering criteria. One such recommender tool is the "Recommend" feature provided on the Alexa Internet Web site. The "Recommend" feature provides a list of related Web pages that a user may want to retrieve and view based on the Web page that they are currently viewing.

Another recommender system is termed "the Knowledge Pump" and is described by Glance, N., Arregui, D. and Dardenne, M. "Knowledge Pump: Supporting the Flow and Use of Knowledge" in *Information Technology for Knowledge Management*. Eds. U. Borghoff and R. Pareschi, New York: Springer-Verlag, pp. 35–45, 1998. The "Knowledge Pump" was designed for use within organizations and has a key focus on the sharing of information in the form of documents.

A characteristic of recommender systems is that they are collaborative in the sense that they utilize knowledge gained from prior queries in making recommendations. In general, collaborative methods of searching seek to utilize the results of previous related queries. Collaborative methods for searching are still in their infancy. However, on the Web search engines are beginning to incorporate simple techniques for collaborative search. The DirectHit Internet Web site has built a popularity engine, which operates using a very simple voting mechanism. Search engines that employ this popularity engine simply track the queries input by users and the links that the users follow. Users vote based on their subsequent viewing of the results, so that in the future, the same query will yield results whose ordering takes into account previous users' actions. Thus entering a query into a search engine that employs DirectHit's popularity engines will return the most popular results for that query. DirectHit also has a related search technology that works by either broadening or narrowing the user's query (using a subset or superset, respectively, of the user's query terms).

The aforementioned Alexia recommender system works similarly, but to augment browsing rather than searching. When a user browses a Web page, similar pages are recommended to the user. The similar pages are obtained by tracking which pages other users have visited after visiting the page currently being viewed. Recommendations are personalized as Alexia builds a profile for each user on the basis of users' ratings of pages.

Some researchers in the information retrieval community have also addressed collaborative search. See for example the following documents: "Document Vector Modification in The Smart Retrieval System: Experiments in Automatic Document Processing," Ed. Gerald Salton, Englewood Cliffs, N.J., 1971, Fitzpatrick; Larry and Dent, Mei "Automatic Feedback Using Past Queries: Social Searching?" In Proceedings of SIGIR'97, Philadelphia, Pa., 1997; and Raghavan, V. V., Sever, H., "On the Reuse of Past Optimal Queries," Proc. of SIGIR95, Seattle, Wash., 1995. Their approach has been to use similar past queries to automatically expand new queries, a kind of second order relevance feedback (i.e., documents that correspond well to similar queries provide feedback on the original query as well). The measure of similarity between queries is a function of the overlap in documents returned by the queries. In all cases, the documents are analyzed linguistically to produce term-frequency vectors which are then combined with query term-frequency vectors to improve the search process. These augmentation procedures are very costly and generally increase the cost of a search greatly. As a result, these methods are viewed critically by on-line search systems.

SUMMARY OF THE INVENTION

The present invention describes a method and system to facilitate searching for information from network attached information sources as may be found on the world wide web. The present invention takes advantage of the collective ability of Web users to create queries. First, a graph is constructed of all queries submitted to a search engine(s) within a given period of time. Each node is a query. A link is created between two nodes whenever the two queries are judged to be related. The determination of relatedness depends on the documents returned by the queries, not on the actual terms in the queries themselves. For example, a criterion for relatedness could be that for the top ten documents returned for each query, the two lists have at least one document in common. When a new query is received, queries that are related are identified. Further described is a way to allow the user to peruse the network of related queries in an ordered way: following a path from a first cousin, to a second cousin to a third cousin, etc. to a set of results.

The method of the present invention is generally comprised of the following steps: obtaining a set of queries; creating a graph of related queries based on the set of queries; responsive to a user query, identifying related queries based on the graph of related queries; and presenting the related queries to the user for their selection.

DETAILED DESCRIPTION OF THE INVENTION

Figure 1:
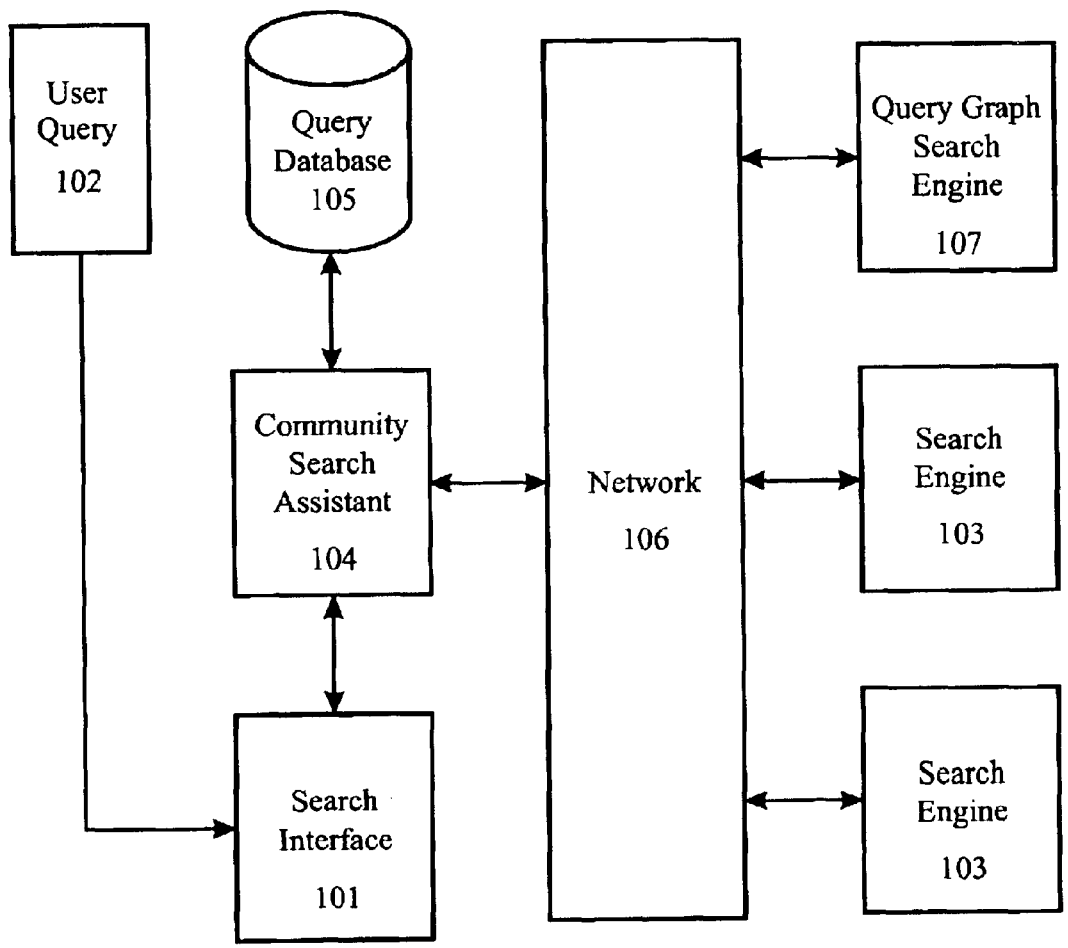
FIG. 1 is a block diagram illustrating the basic components of the currently preferred embodiment of the present invention.

A method and system to facilitate searching for information from network attached information sources, such as those found on the World Wide Web is disclosed. The system provides a collaborative mechanism for users to tacitly share knowledge based on their queries and their query results. The currently preferred embodiment of the present invention is implemented for searching collections of linked documents (i.e. Web Pages) residing on the portion of the Internet known as the World Wide Web (hereinafter the Web). The Web is the portion of the Internet that is used to store and access linked documents. A Web page is accessed by its Uniform Resource Locator (URL) address. A Web site is a generic term for various types of Web locations. In one instance, a Web site is a collection of related Web pages associated with an entity having a presence on the World Wide Web such as a company, educational institute or the like. Alternatively, a web site can be a "portal" for providing users of the web an entry point to the World Wide Web. A web site may also be a repository or information source containing collections of documents which may be accessed via the Web. Generally, a web site will have a high level URL (e.g. HighLevelURL), whereas the pages on the site will have lower level qualifiers (e.g.; HighLevelURL/ LowLevelQualifier).

A Web Browser is a tool which enables a user to traverse through and view documents residing on the Web. Other rendering means associated with the Browser will permit listening to audio portions of a document or viewing video or image portions of a document. Examples of commercially available Web Browsers include Netscape Navigator®, available from Netscape Communications Corporation, and Internet Explorer, available from the Microsoft® Corporation.

A search engine is a Web Site that provides for searching for documents (e.g. web pages) available on the World Wide Web. Search engines will typically index information identifying Web pages on other sites on the World Wide Web in order to facilitate the search. Examples of available search engine Internet Web sites are Alta Vista®, Yahoo!®, and Excite(sm).

Overview of the Present Invention

Both the Web and the number of people tapping into it via search engines continue to grow exponentially. Thus, it is reasonable to hypothesize that for any given information need, there is a high probability that some person has formulated a good query representation for it in the recent past. In the present invention, user searching is enhanced by capturing the knowledge of other users who searched for similar information. Conceptually what is done is to construct a graph of all queries submitted to a search engine(s) within a given period of time. A key idea is that the construction of the query graph transforms single user usage of the Web (e.g. search) into collaborative usage: all users can tap into the knowledge base of queries submitted by others. The graph will indicate relationships between queries and could be of various forms. A key is that there is some representation wherein the relationships between queries can be maintained and be readily determinable.

In the currently preferred embodiment, the determination of relatedness depends on the documents returned by the queries and not on the actual terms in the queries themselves. For example, a criterion for relatedness could be that for the top ten documents returned for each query, the two lists have at least one document in common. Finally, the currently preferred embodiment of the present invention describes a way to allow the user to peruse a presentation of the network of related queries in an ordered way: following a path from a first cousin, to a second cousin to a third cousin, etc. to a desired set of results.

FIG. 1 is a block diagram which illustrates the basic components of an implementation of the present invention. Referring to FIG. 1, a search interface 101 enables a user query 102 to be directed to one or more search engines 103. The search engines 103 are coupled via a network 106 (e.g. the Internet) to the search interface 101. Also coupled to the network 106 is query graph search engine 107. The query graph search engine is one that is used specifically for the purpose of building the query graph and providing results to the query database 105. Various aspects of search interface of the currently preferred embodiment can be found in the following PCT Publications WO 98/48359 (Oct. 29, 1998) and WO 98/48361 (Oct. 29, 1998).

The search engines can be either Web accessible (e.g. Lycos, AltaVista or Googles), or a search can be directed to a proprietary database (e.g. the DocuShare product available from Xerox Corporation). The manner in which a search interface 101 interfaces with the various search engines is known in the art. For example, various meta searchers exists such as dogpile and askOnce, wherein a single query can be directed to multiple search engines and the results from the various search engines are merged together. In the currently preferred embodiment, "wrappers" are developed for interfacing with the various search engines. The "wrappers" take a query and present it to the search engine in a format and protocol accepted by the search engine. The "wrappers" as may be utilized herein are further described in co-pending application Ser. No. 09/361,496 entitled "System and Method of Automatic Wrapper Generation" which is assigned to the same assignee of the present application.

Augmenting the functionality provided by search interface 101 is community search assistant 104. It should be noted that the community search assistant is independent of any particular search engine, but will typically use a particular search engine, i.e. the query graph search engine 107, in creating the query graph information that is different from the one that the query was sent to. This is preferable based on an observation that search engines with certain characteristics (e.g. the methodology used for ranking returned results) may provide better results. The community search assistant will maintain the previous query information and make the determination if queries are related. Note that the search engine used to measure relatedness need not be the same search engine as the one from which the set of user queries was obtained. Coupled to the community search assistant 104 is query database 105. The query database 105 will be used to store and retrieve the query information.

It should be noted that the present invention may also be implemented such that it only interacts with a single search engine. In this case, the search interface 101 may be integrated as part of one of the search engines 103. Likewise, the community search assistant 104 would then be directly coupled to the search engine 103. Also, the present invention may be implemented so that the community search assistant 104 is embedded and contained within the functionality of the search interface 101.

Figure 2:
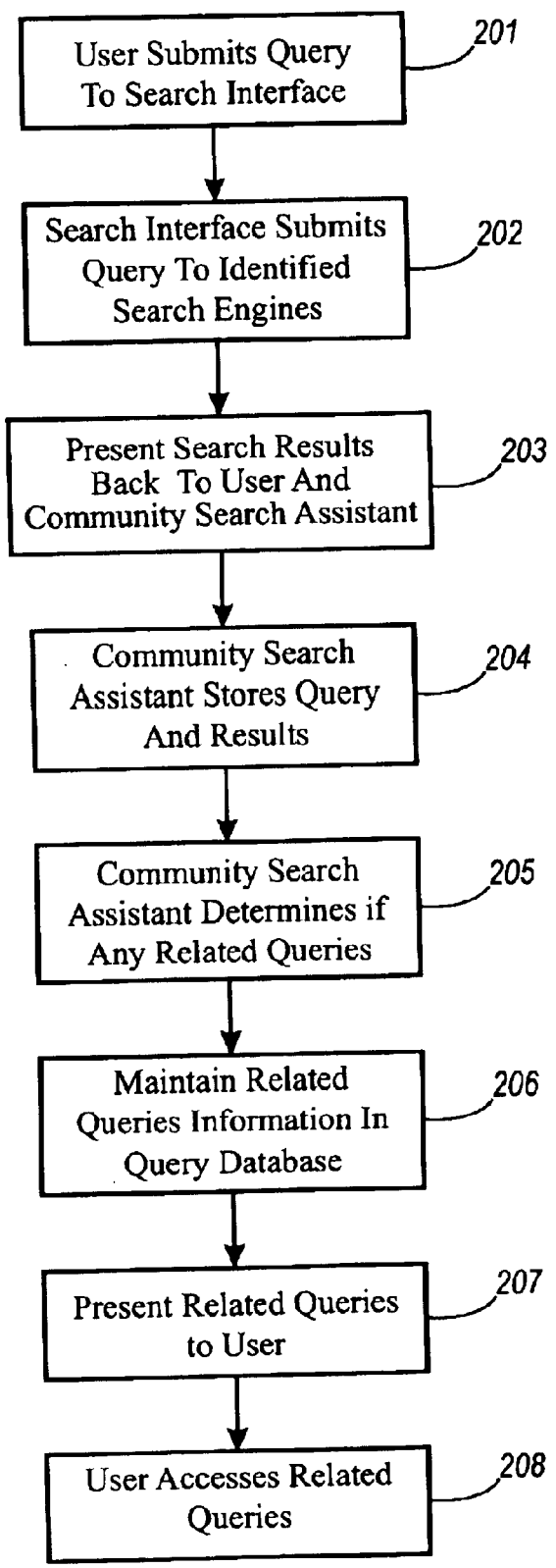
FIG. 2 is a flowchart describing the basic steps for interfacing with the currently preferred embodiment of the present invention.

FIG. 2 is a flowchart describing the basic steps for interaction with the present invention. First, a user submits a query to the search interface, step 201. The query will include query terms and may specify the particular search engines that the query should be directed to. The search Interface will then submit the query to the identified search engines, step 202. The search results are then presented back to the user and to the community search assistant, step 203. It should be noted that the search results may be presented in various ways, e.g. exactly as they are provided from the respective search engines, or merged to eliminate any overlapping documents. Further, a "rule" must be decided upon to determine which results to provide to the community search assistant. It could be either what is presented to the user, or it could be the results from one of the selected search engines. Also, the results for the purpose of the community search assistant may differ from what is presented to the user. For example, the user may want all the results, whereas for the community search assistant, only the top 10 results are provided.

Next the community search assistant will then store the query and its results, step 204 and determine if there are any previous related queries, step 205. In the currently preferred embodiment, the criteria for determining if queries are related will depend on the "overlap" of results between queries. For example, a predetermined number of common documents in the results may be a criteria to establish that documents are related. In any event, related queries information is maintained with the query in the query database, step 206. The queries found to be related to the submitted query are then presented to the user by the search interface, step 207. At this point, the user may then access one or more of the identified related queries, step 208.

Community Search Assistant

Figure 11:
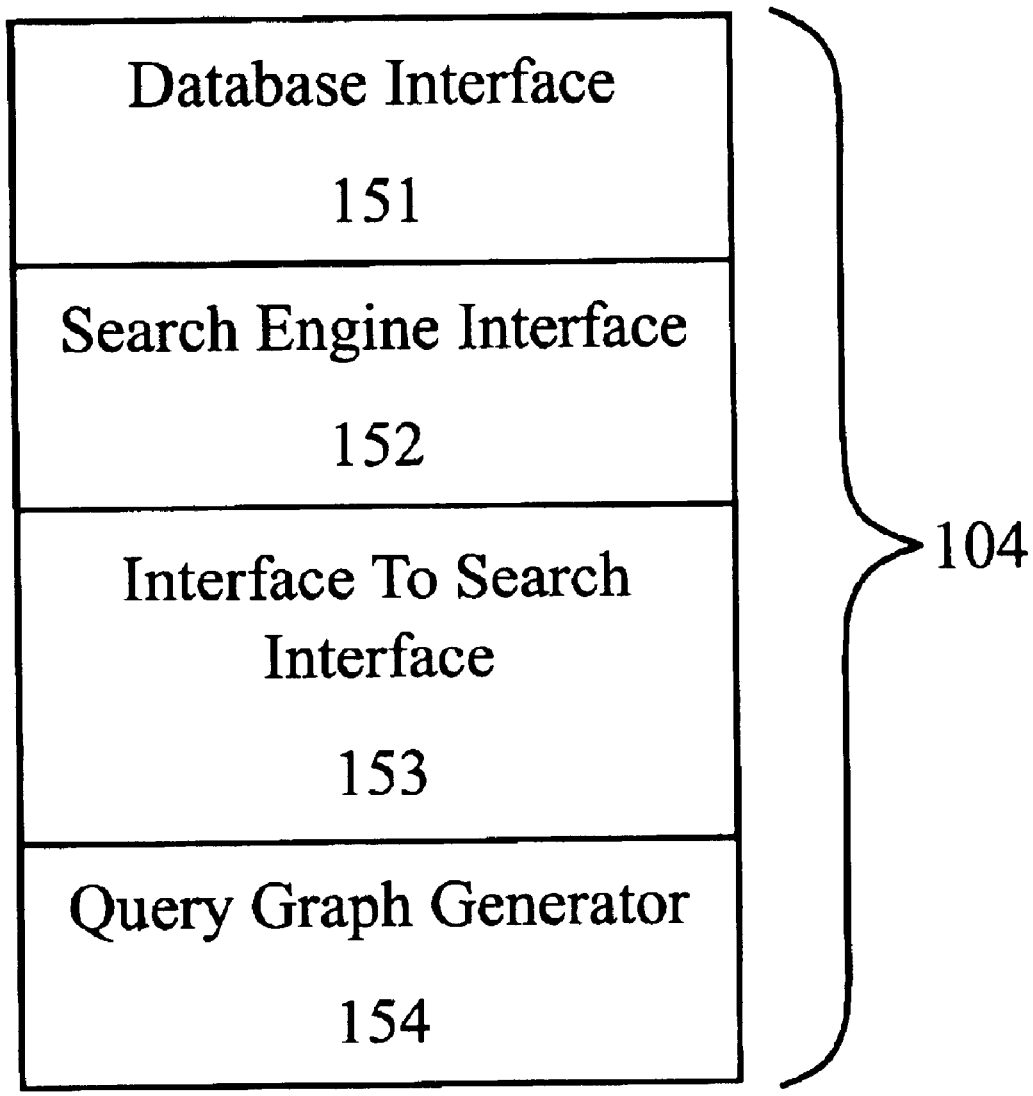
FIG. 11 is a block diagram illustrating the functional components of a community search assistant as may be utilized in the currently preferred embodiment of the present invention.

Much of the functionality of the present invention resides in the community search assistant. The community search assistant processes a set of queries from a particular community (e.g. the users of a particular search engine), in order to extract the knowledge of that community. FIG. 11 is a block diagram illustrating the basic components of the Community Search Assistant. Referring to FIG. 11, community search assistant 104 is comprised of interfaces to various other components, such as database interface 151, search engine interface 152 and an interface to the search interface 153. Further, a query graph generator 154 enables the creation of a query graph and processes the requests for identification of related queries. The operation of the query graph generator is described below with respect to Query Graph Generation, Finding Related Queries and Responding to User Queries.

Query Graph Generation

Implementation of the invention requires access to a set of queries made to a search engine or a set of search engines over a period of time. The set of queries might come from a user base as broad as that of the Web or instead might be limited to a user base within a company Intranet. The advantage of broader user base would be an increased probability of overlap in information needs for any given information need. The advantage of a more restricted user base would be tighter focus and less noise (e.g. unrelated queries).

In the present invention, a query graph refers to a data structure or other mechanism by which query relationships are maintained. Conceptually, the query graph contains the necessary information to construct a node-link structure wherein each node is a query. Two nodes are connected whenever the queries are calculated to be related. The query graph can be reconstructed incrementally or periodically from an augmented query set to best reflect the current content on the network and its current usage (in the form of queries).

Figure 3:
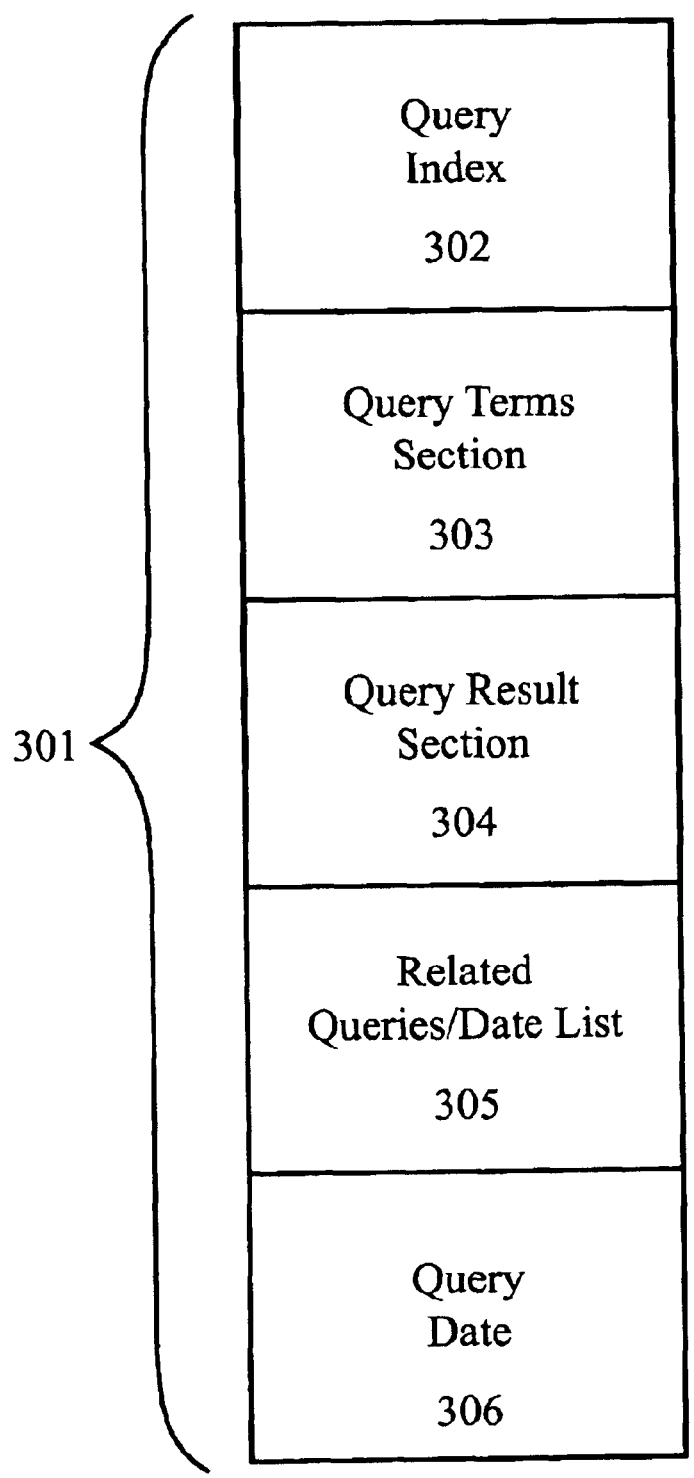
FIG. 3 is a block diagram of a data structure for a query data record as may be utilized in a database in the currently preferred embodiment of the present invention.

A data structure describing an individual record in a query graph is illustrated with respect to FIG. 3. Referring to FIG. 3, a query record 301 is comprised of a query index 302 to identify the query, the query terms section 303 which lists the terms used in the query, a result section 304 which identifies the results associated with the query, a related query list 305 which identifies the related queries and the date the list was generated, and a query date 306 which indicates the date the query was last made. It should be noted that other information could be saved, e.g. all dates on which a particular query is made, or the number of times a particular query is made. Also, although not illustrated each related query will have an associated "count" which indicates the number of documents in common based on the "related query" criteria.

In the currently preferred embodiment, the results from a predetermined search engine is used to generate the query graph. So even if that predetermined search engine was not selected for retrieval, the query is generated for it. A query graph is implemented with a relational database, such as SQL. In the currently preferred embodiment, the database used is "mysqI" (available for research purposes at the mysql Internet Web site), however, any such database product may be utilized.

Figure 4:
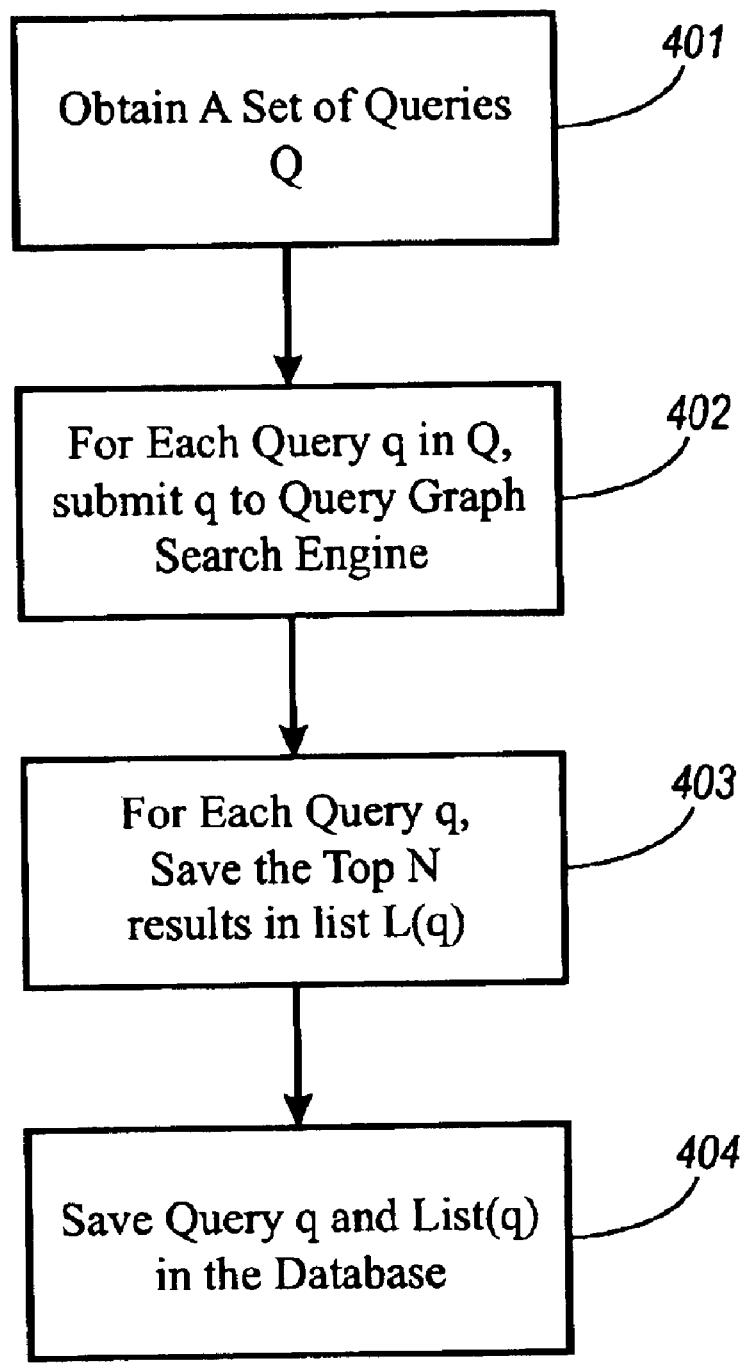
FIG. 4 is a flowchart describing the steps in building an initial query information set as may be utilized in the currently preferred embodiment of the present invention.

FIG. 4 is a flowchart illustrating the steps for building a database with an initial query set. Referring to FIG. 4, a set of queries Q is obtained, step 401. The set of queries may be collected over a period of time. Note that these queries need not have been submitted to the same search engine. Then, for each query q in Q submit q to a search engine for developing the query graph, step 402. Note that this search engine is not the same search engine to which the original query was sent. For each query q, the top N results of a query q are saved in a list L(q), step 403. The query q and corresponding list L(q) are saved in the database, step 404.

Finding Related Queries

As noted above, in the currently preferred embodiment, the degree of query relatedness is dependent on the overlap of documents returned. One measure of relatedness, for example, is the number of items in common in the top N that are returned by a search engine or by the selected search engines. In the currently preferred embodiment N=10, but any other number of documents may be used. For the purpose of constructing the graph, the measure of relatedness is considered to be binary, i.e. two queries are either related or not.

Other measures of relatedness could include other more sophisticated analysis of the returned results, such as linguistic analysis or citation analysis.

Figure 5:
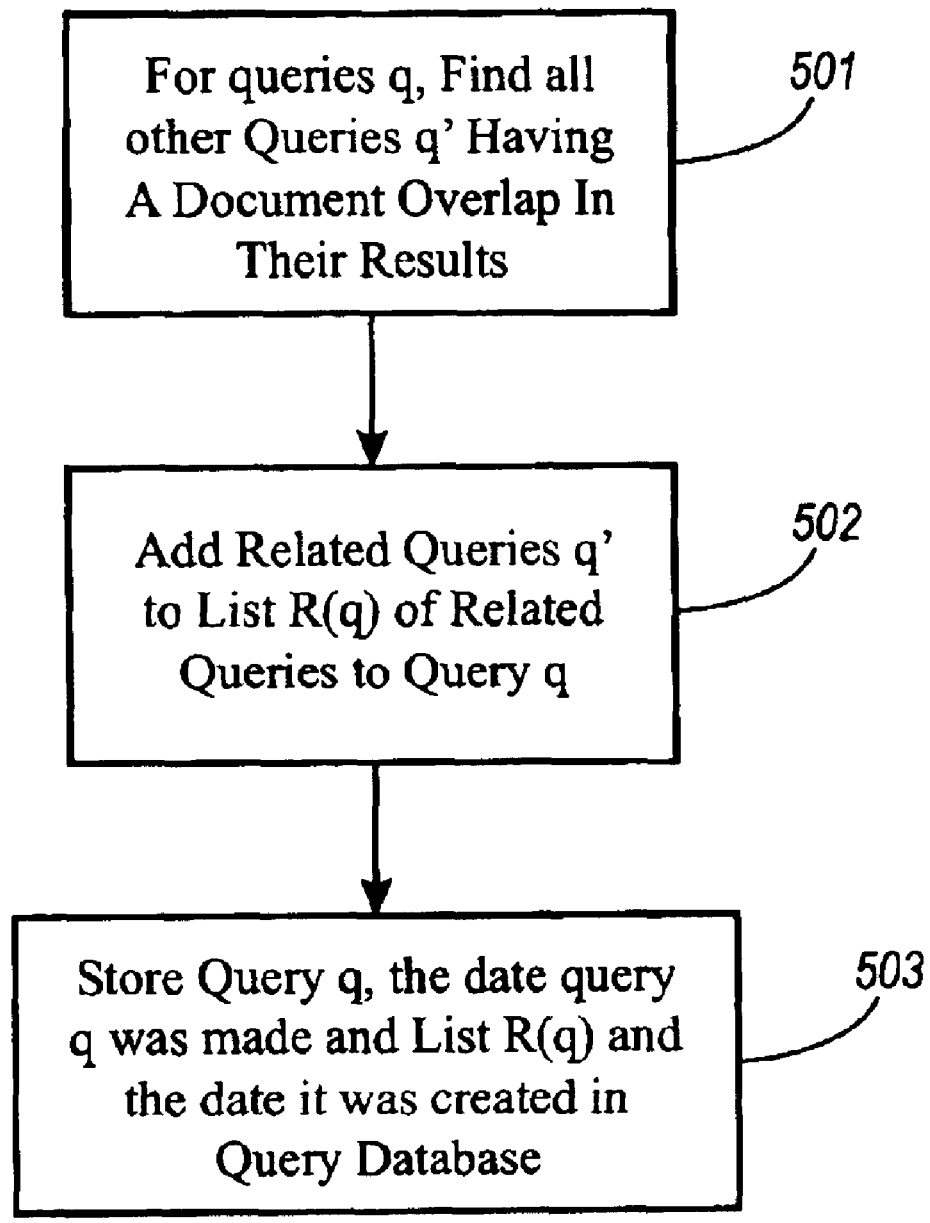
FIG. 5 is a flowchart describing the steps for providing related query information for the initial query information set as may be utilized in the currently preferred embodiment of the present invention.

FIG. 5 is a flowchart illustrating the steps for finding the related queries for queries q in the database. Referring to FIG. 5, for all queries q, find all queries q' in Q such that the intersection, I(q,q'), of L'(q') and L(q) is not empty, step 501. In other words, there are results in the list L(q) that are also in the list L'(q') for query q'. Next, the queries q' which are identified as related in step 501 are added to list R(q) of related queries, step 502. Finally, the query q, its latest submission date and list R(q) along with the date it was created and a match count for each related query are stored in the database, step 503. It should be noted that the same query q may be submitted more than once, and it may be useful to maintain this query history information.

Variants on criteria for determining related queries are:
Two queries are defined as related when at least one pair of URLs overlaps (instead of matching exactly), where the overlap exceeds some threshold.
Match queries by other meta-attributes of responses, such as title, summary, retrieved content of document, summary of content of document, etc.

Responding to User Queries

Figure 6:
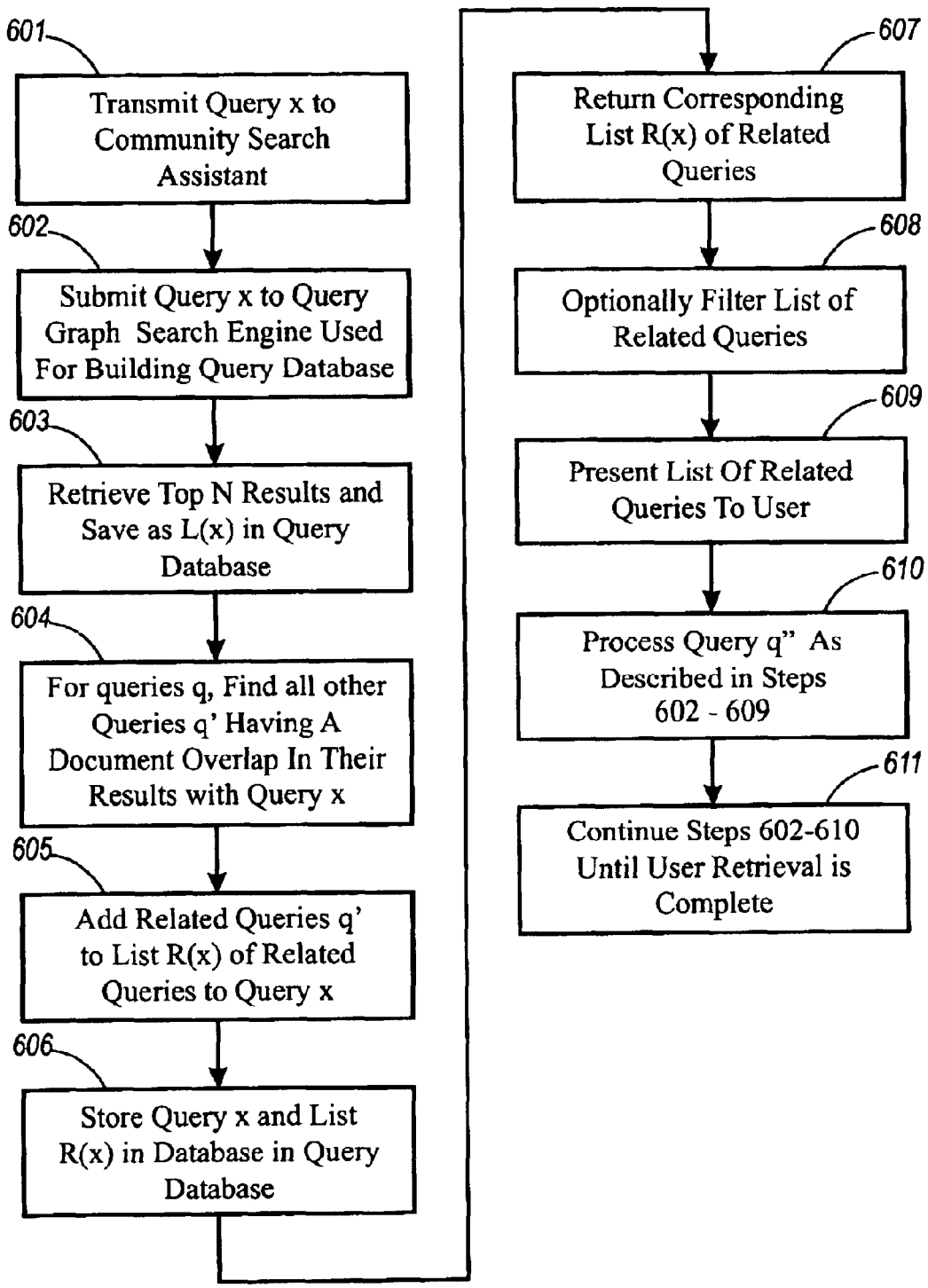
FIG. 6 is a flowchart describing the steps for processing a new query and subsequently finding related query as may be utilized in the currently preferred embodiment of the present invention.

FIG. 6 is a flowchart illustrating the steps for processing a query wherein related queries are identified. Referring to FIG. 6, first the query x is transmitted to the community search assistant, step 601. The community search assistant will then submit query x to the query graph search engine used for the building the query database, step 602. Note that this may mean that the query could be sent to a different search engine than the one it was originally submitted to. The top N results for the new Query x are retrieved and saved as L(x) in the query database, step 603. As noted above, in the currently preferred embodiment N=10. Next, for the query x, find all queries q' in Q such that the intersection, I(x,q'), of L'(q') and L(x) is not empty, step 605. In other words, there are results in the list L(x) that are also in the list L'(q') for query q'. Note as described above, other criteria for relatedness may be used. Next, the queries q' which are identified as related in step 604 are added to list R(x) of related queries, step 605. The query x and list R(x) are then stored in the query database, step 606. Finally, the list R(x) of related queries is returned, step 607. In the currently preferred embodiment, the top 12 related queries, ordered by highest count in common first, are returned.

Prior to the list of related queries being presented to the user, optional filtering may be performed, step 608. Such filtering may include removing queries that contain certain keywords, ranking related searches by magnitude of overlap, or by some other metric. The resulting list of related queries is then presented to the user, step 609. Such a list is typically ordered by some heuristic (e.g. alphabetical, or strength of relatedness). If a user selects a related query q'', then the query q'' is processed as described in steps 602–609, step 610. Finally, the steps 602–610 are repeated until the user no longer wishes to view related queries, step 611.

Note that the bulk of the computational effort is bootstrapping the graph from a large set of queries and this is done ahead of time. On-the-fly computation is required only as indicated in FIG. 6, when a new query Q is submitted and the calculation of the intersection between a new query and all existing saved queries is determined. This calculation can be optimized by creating a database table (URL, query), indexed by URL or other document identifier.

It should also be noted that it would be possible to determine if the query was previously submitted and is contained in the query database and to bypass certain processing steps (e.g. steps 602–606 of FIG. 6). However, this may result in the query database having out-dated or "stale" query information.

Although not implemented in the currently preferred embodiment, in order to avoid "stale" query information various approaches may be taken. First approach. (1) make a copy of the query memory database; (2) re-determine the query, date, URLs for each query in the copy; (3) re-calculate the set of related queries; (4) replace the old query memory database with the new one. Based on the current state of computing technology, this takes anywhere from hours to days for 50,000 queries, depending on the level of parallelization.

Second approach: This one is less expensive in time and more incremental: for each query submitted via the collaborative search assistant, save all related queries generated by the assistant. Process this list off-line periodically (once a day, for example): find URLs for all queries in the list and recalculate related queries for them. There would still be the problem of stale information, but only for queries not related to current user interests. This approach has the advantage of being less costly.

Third proposal. Periodically delete all data older than a certain date. For example, keep only queries and related query calculations from the last week. Note that this requires saving date information.

The approach taken to minimize "stale" query records will depend on the cost/benefit tradeoff of keeping the query records up to date.

User Interface

Figure 7:
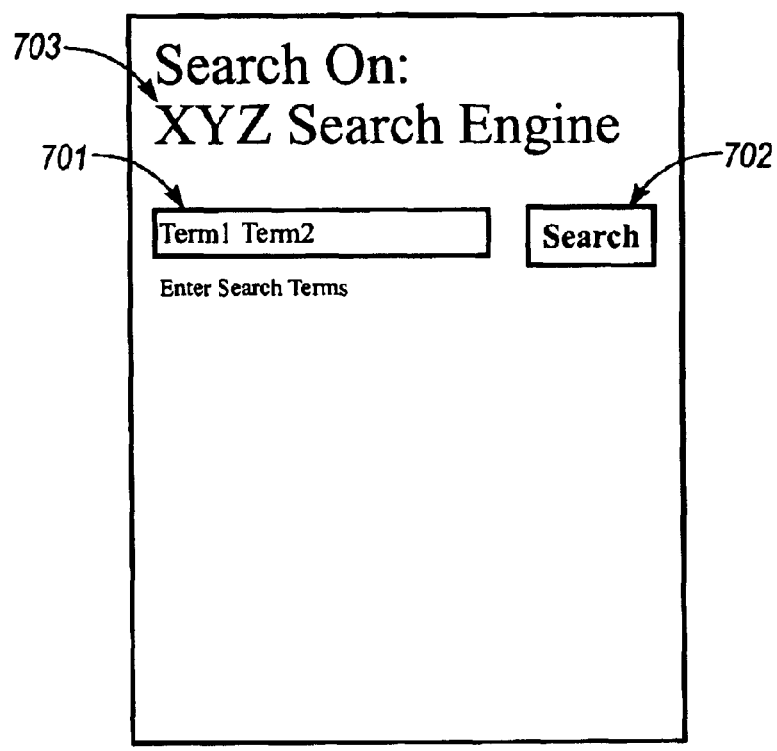
FIGS. 7 and 8 are illustrations of a user interface for using the currently preferred embodiment of the present invention.
Figure 8:
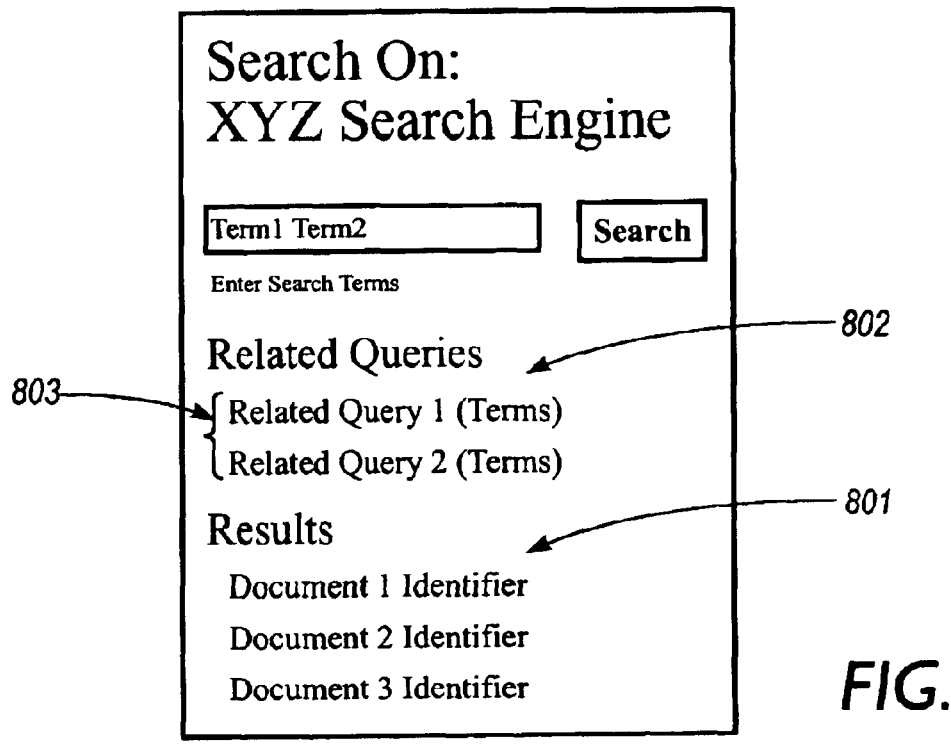

FIGS. 7–8 illustrate a user interface in the currently preferred embodiment. Such user interfaces would be presented on a computer display in a "window" by the Search Interface 101 of FIG. 1. Referring to FIG. 7, a user enters one or more query terms into query area 701. The query is submitted by "clicking" on the search button 702. Also indicated in FIG. 7 is a title 703 which indicates which Search Engine(s), the query is being directed to. Alternatively, checkboxes could be provided to indicate which search engine(s) the query is to be directed to. Referring now to FIG. 8, when the query results are returned, they are displayed in results area 801. The results area 801 would typically order the results based on their relatedness to the search terms. However, various other techniques could be used, depending on the number of search engines being queried. Further displayed is a related query area 802. When a user enters a query, s/he is presented with a set of related searches, queries 803. The related searches can be ordered by degree of relatedness, highest relatedness first.

In the currently preferred embodiment, the top 12 related queries, ordered by highest count in common first are presented. Also note that the related query area would typically be scrollable, or alternatively the entire user interface window may be scrollable, to enable the display and viewing of the entire list of related queries. After clicking on a related search, the user is then presented with a set of relevant documents for the related search, as well as a second set of related searches (two hops away from the original query in the graph). In this way, by clicking on a sequence of related searches, the user can follow a path through the query graph. The user can backtrack either using the "Back" button of the browser or by clicking on links provided by the interface for that purpose.

Finally, it should be noted that in the currently preferred embodiment, the user interface is implemented as a web page operating under the control of a web browser. Accordingly results lists are presented as lists of documents having underlying URLs, wherein the user may "click" on a document and then be presented with a new window containing the document located at that URL.

Figure 9:
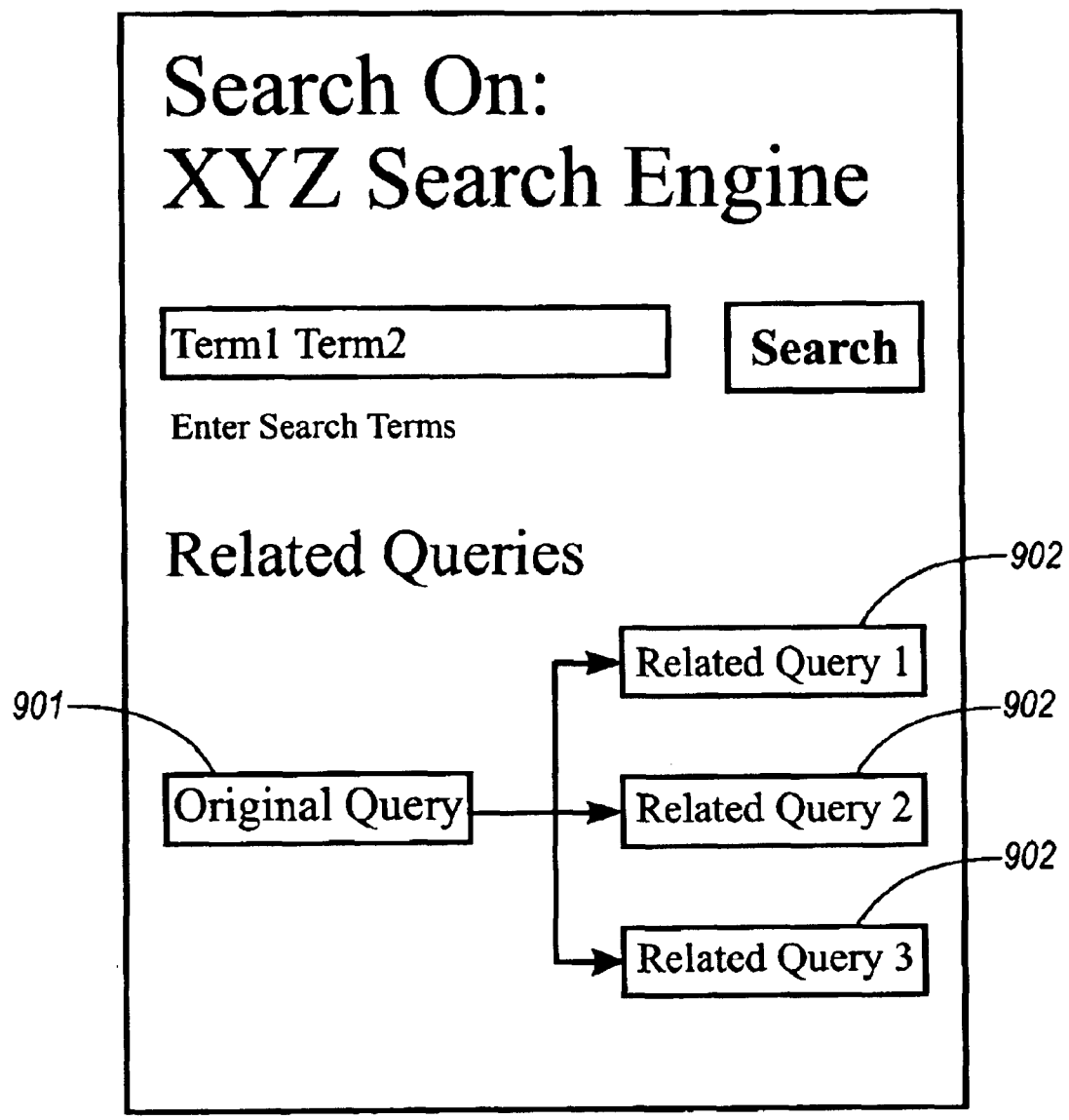
FIG. 9 is an alternative embodiment of a tree structure for displaying related queries in a user interface as may be utilized in the currently preferred embodiment of the present invention.

The user interface to the search engine could also be augmented to provide a graphical user interface indicating the relationships between the queries. This could be provided in the related query area 802 of FIG. 8, or as a separate window. Such a user interface is illustrated in FIG. 9. Referring to FIG. 9, the related queries are presented using a tree representation, with the original query 901 at its root and the various related queries as leaves 902. Note that the leaves are displayed in a multi-level hierarchical fashion and are accessible using the well known point and click interface technique. The tree representation can be presented using a conventional tree viewer, or a more sophisticated visualization such as the hyperbolic tree visualization technology available from InXight, a Xerox XNE Company, of Palo Alto, Calif.).

EXAMPLE

Operation of the present invention is further illustrated through the following example. It should be noted that the results found here are not necessarily reproducible because of the ever changing and dynamic nature of information found on the Internet. Suppose that a user is searching for the Web page of a particular conference on mobile computing whose name they don't recall. The user submits a query to a search engine (in this example the query was executed using the "google" search engine found on the Google™ Internet Web site) using the keywords "mobile computing conference" and get hundreds of responses, and nothing in the top 10 or even top 50 rings a bell. Further suppose that the user does not know how to best modify the query terms to find what they are looking for. Generalizing the search to "mobile computing" doesn't help and neither do any of the suggested related searches or "recommendations" that are provided by the search engine.

Now suppose someone else out there searching for the conference's web site might remember its name, in this case, HUC'99 (the International Symposium on Handheld and Ubiquitous Computing). The original user is unlikely to find it using their original query, since it's actually a symposium, not a conference and the keywords are handheld computing not mobile computing. It would be desirable to take advantage of the fact that someone else has entered the query appropriate to the original users information need, given that the terms in the queries have zero overlap (mobile computing vs. HUC 1999).

It turns out that although the two queries have no terms in common, there is a relationship between the two which may be induced from the documents returned to them.

Referring back to the example of the query mobile computing, it was observed that the query handheld computing conference is a first cousin, among numerous others. By first cousins it is meant that they are directly related. The exact queries will depend on what other users have actually submitted. The two queries both return "*Mobile and Context-Aware Computing at UKC*" in their top ten Web page results, and thus are connected to each other in the graph. If the term handheld rings a bell, the user might well follow the graph in this direction. Next, the user might be presented with handheld computing as a first cousin to handheld computing conference (thus, a second cousin to the original query) because both queries have in common the Web page "*Press Release—BidCom Brings Handheld Computing to The Building Industry.*" The page the user is looking for is returned in the top ten documents for this query. Alternatively, the user might more rapidly find it by perusing the next set of related queries (now third order cousins to my original query), if some other user has been kind enough to have made the query HUC 1999. Through this process of examining related queries, the query terms and the associated results lists, the user may find the information they are searching for.

Figure 10:
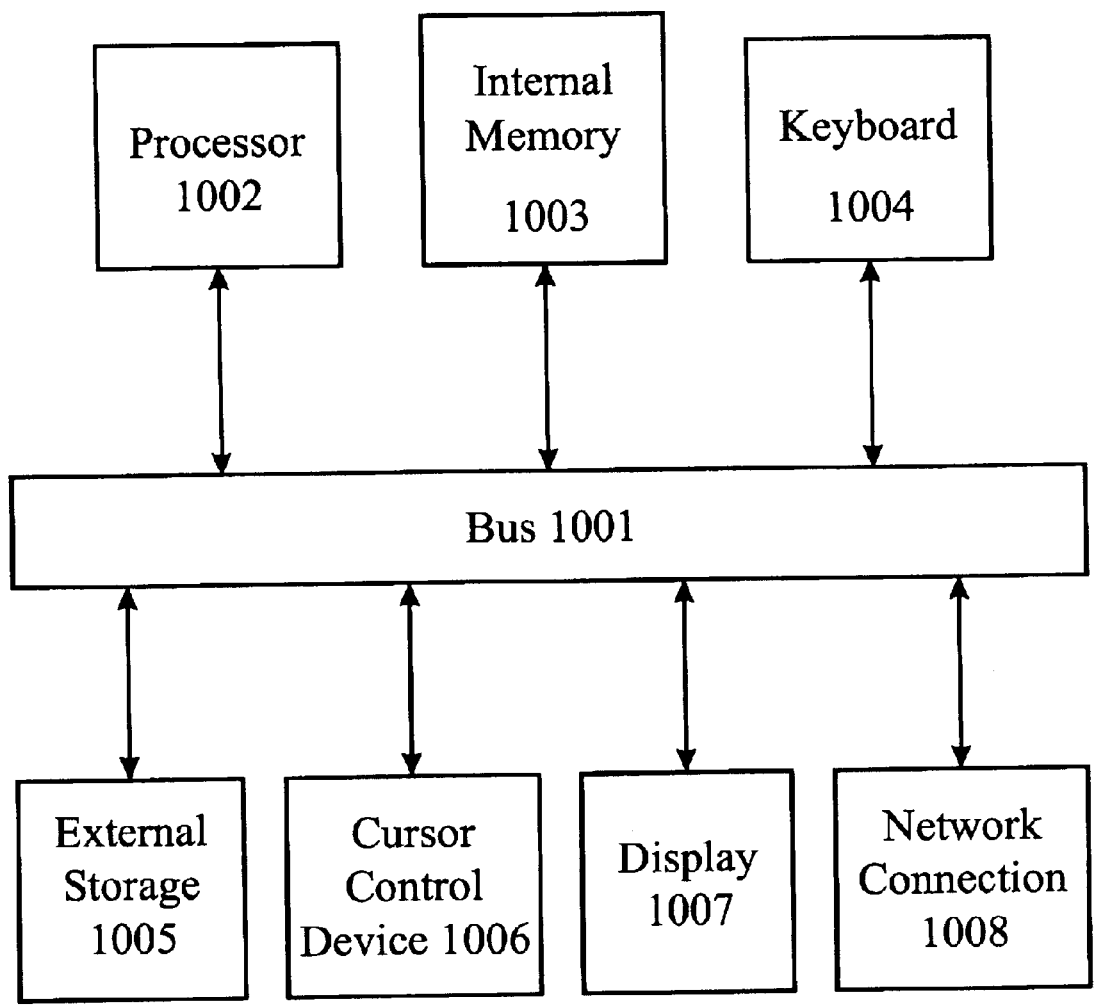
FIG. 10 is a block diagram of a computer system that may be utilized to implement the system of the currently preferred embodiment of the present invention.

Overview of a Computer Controlled Display System in the Currently Preferred Embodiment of the Present Invention A computer based system on which the currently preferred embodiment of the present invention may be implemented is described with reference to FIG. 10. As noted above, the present invention is implemented using software programming instructions written in shell, gawk and mysql (SQL) scripting languages for execution on a computer based system. The computer based system and associated operating instructions (e.g. software) embody circuitry used to implement the present invention. Referring to FIG. 10, the computer based system is comprised of a plurality of components coupled via a bus 1001. The bus 1001 may consist of a plurality of parallel buses (e.g. address, data and status buses) as well as a hierarchy of buses (e.g. a processor bus, a local bus and an I/O bus). In any event, the computer system is further comprised of a processor 1002 for executing instructions provided via bus 1001 from Internal memory 1003 (note that the Internal memory 1003 is typically a combination of Random Access and Read Only Memories). The processor 1002 will be used to perform various operations as illustrated by the steps of the flowcharts in FIGS. 4–6. Instructions for performing such operations are retrieved from Internal memory 1003. Such operations that would be performed by the processor 1002 would include the processing steps described in the flowcharts of FIG. 3 and the accompanying descriptions. The operations would typically be provided in the form of coded instructions in a suitable programming language using well-known programming techniques. The processor 1002 and Internal memory 1003 may be discrete components or a single integrated device such as an Application Specification Integrated Circuit (ASIC) chip.

Also coupled to the bus 1001 are a keyboard 1004 for entering alphanumeric input, external storage 1005 for storing data, a cursor control device 1006 for manipulating a cursor, a display 1007 for displaying visual output and a network connection 1008. The keyboard 1004 would typically be a standard QWERTY keyboard but may also be telephone like keypad. The external storage 1005 may be fixed or removable magnetic or optical disk drive. The cursor control device 1006, e.g. a mouse or trackball, will typically have a button or switch associated with it to which the performance of certain functions can be programmed. The network connection 1008 provides means for attaching to a network, e.g. a Local Area Network (LAN) card or modem card with appropriate software. The network ultimately attached to is the Internet, but it may be through proxy servers or intermediary networks or dial-up services such as America On-Line®, Prodigy® or CompuServe®.

Thus, a system for providing enhanced searching capabilities based on queries from a community of users is disclosed. While the present invention is described with respect to a preferred embodiment, it would be apparent to one skilled in the art to practice the present invention with other configurations of digital document management systems. Such alternate embodiments would not cause departure from the spirit and scope of the present invention.

What is claimed is:

1. A network based information retrieval system comprising:
   a) a search interface for enabling a user to submit a query to one or more search engines;
   b) a community search assistant for providing a list of queries related to the query submitted by said user, said community search assistant further comprising:
      b1) a search engine Interface for interfacing with a query graph creation search engine used for identifying related queries to obtain query information, said query information including query result lists obtained with at least one query of the related queries having a search term that is different from a search term of another one of the related queries;
      b2) query relationship processing means for processing the query information so that related queries may be identified, said related queries identified based on said corresponding query result lists and independent of their corresponding search terms; and
   c) a storage device coupled to said community search assistant for storing a query database, said query database for storing said query information.

2. The information retrieval system as recited in claim 1 wherein said query relationship processing means is further comprised of query result comparing means, said query result processing means for comparing the query result lists of query pairs to determine if a relationship exists between said query pairs.

3. The information retrieval system as recited in claim 2 wherein said query result comparing means determines a relationship exists when an overlap is identified between said query result lists.

4. The information retrieval system as recited in claim 3 wherein said query result comparing means determines a relationship exists based on a textual analysis between said query result lists.

5. The information retrieval system as recited in claim 1 wherein said search interface further comprises means for displaying a user interface to a user, said user interface defining a first area for displaying query results and a second area for displaying related queries.

6. The information retrieval system as recited in claim 5 wherein said second area of said user interface displays said related queries in a tree-like structure.

7. For an information retrieval system, a method for facilitating document searching comprising the steps of:
   a) obtaining a set of queries with at least one query in the set of queries having a search term that is different from a search term of another query in the set of queries;
   b) creating a graph of nodes and links with each node in the graph identifying a query in the set of queries and each link in the graph identifying related queries based on the results for each query of said set of queries and independent of their corresponding search terms;
   c) responsive to a user query, identifying related queries based on said graph of related queries; and
   d) presenting said related queries to said user for their selection.

8. The method as recited in claim 7 wherein said step of creating a graph of related queries is further comprised of the steps of:
   b1) submitting each query in said set of queries to a query graph generation search engine and obtaining the top N results for each of said queries;
   b2) storing each query and corresponding top N results in a database;
   b3) for each query in said set of queries, comparing the query results to the results of other queries to create a related query list; and
   b4) storing the related query list for each query in said set of queries in said database.

9. The method as recited in claim 8 wherein said step of responsive to a user query, identifying related queries based on said graph of related queries performing the steps of:
   c1) submitting said user query to said graph generation search engine and obtaining the top N results for said user query;
   c2) storing said user query and corresponding top N results in said database;
   c3) comparing the user query results to the results of other queries in said database to create a related query list for said user query;
   c4) storing the related query list for said user query in said database; and
   c5) returning said related query list for display to said user.

10. The method as recited in claim 7 wherein said step of presenting said related queries to said user for their selection is further comprised of the steps of presenting a tree structure representation of said related structures.

11. The method as recited in claim 7 further comprising the step of:
   e) responsive to a user selecting a related query, performing the step of presenting to said user the results list of said selected related query and the related queries of said selected query.

12. The method as recited in claim 11 wherein prior to said step of presenting to said user the results and the related queries of said selected query, performing the steps of:
   submitting said selected related user query to said graph generation search engine and obtaining the top N results for said selected related user query;
   storing corresponding top N results of said selected related query in said database;
   comparing the selected related user query results to the results of other queries in said database to create a related query list for said selected related user query;
   storing the related query list for said user selected related query in said database; and
   returning said related query list of said selected related query for display to said user.

13. A method for information retrieval comprising the steps of:
   a) creating a database of queries from a community of users, said database storing queries and corresponding results list for said queries with at least one query in said database having a search term that is different from a search term of another query in said database;
   b) responsive to a user query performing the steps of:
      b1) submitting said user query to a first search engine to obtain a first list of results;
      b2) submitting said user query to a second search engine to obtain a second list of results;
      b3) comparing said second list of results to results lists of other queries in said database independent of search terms of the corresponding queries;
      b4) determining a related query exists when a predetermined relationship is found between said second list of results and results lists of other queries;
      b5) presenting said first list of results and related queries identified in step b4) as a list of related queries for said query to said user;

c) responsive to a user selection of a related query, performing the steps of:
- c1) submitting said selected related query to said second search engine to obtain a list of results for said selected related query;
- c2) comparing said list of results for said selected related query to results lists of other queries in said database independent of search terms of the corresponding queries;
- c3) determining a related query exists when said predetermined relationship is found between said list of results for said selected related query and results lists of other queries; and
- c4) presenting said list of results of said selected related query and related queries identified in step c3) as a list of related queries for said query to said user.

14. The method as recited in claim 13 wherein said predetermined relationship is when a predetermined number of documents exist in both of the results lists being compared.

15. The method as recited in claim 13 wherein said step of creating a database of queries from a community of users, said database storing queries and corresponding results list for said queries is comprised of the steps of:
- a1) obtaining a set of queries;
- a2) submitting each query in said set of queries to said second search engine and obtaining the top N results for each of said queries;
- a3) storing each query and corresponding top N results in a database;
- a4) for each query in said set of queries, comparing the query results to the results of other queries to create a related query list;
- a5) storing the related query list for each query in said set of queries in said database.

* * * * *